(12) United States Patent
Oliver et al.

(10) Patent No.: US 9,471,712 B2
(45) Date of Patent: Oct. 18, 2016

(54) APPROXIMATE MATCHING OF STRINGS FOR MESSAGE FILTERING

(75) Inventors: Jonathan J. Oliver, San Carlos, CA (US); Andrew F. Oliver, Glenhuntly (AU)

(73) Assignee: DELL SOFTWARE INC., Round Rock, TX (US)

(*) Notice: Subject to any disclaimer, the term of this patent is extended or adjusted under 35 U.S.C. 154(b) by 0 days.

(21) Appl. No.: 11/927,458

(22) Filed: Oct. 29, 2007

(65) Prior Publication Data

US 2008/0104062 A1 May 1, 2008

Related U.S. Application Data

(63) Continuation of application No. 10/869,507, filed on Jun. 15, 2004, now abandoned.

(60) Provisional application No. 60/543,300, filed on Feb. 9, 2004.

(51) Int. Cl.
*G06F 17/30* (2006.01)
*H04L 12/58* (2006.01)

(52) U.S. Cl.
CPC ....... *G06F 17/30985* (2013.01); *H04L 12/585* (2013.01); *H04L 51/12* (2013.01)

(58) Field of Classification Search
CPC G06F 17/30985; H04L 51/12; H04L 12/585
USPC .............................. 709/204–206; 726/22, 13
See application file for complete search history.

(56) References Cited

U.S. PATENT DOCUMENTS

| 6,105,022 | A | 8/2000 | Takahashi et al. |
| 6,112,227 | A | 8/2000 | Heiner |
| 6,122,372 | A | 9/2000 | Hughes |
| 6,161,130 | A * | 12/2000 | Horvitz et al. ............... 709/206 |
| 6,199,102 | B1 | 3/2001 | Cobb |
| 6,330,590 | B1 | 12/2001 | Cotten |
| 6,487,586 | B2 | 11/2002 | Ogilvie et al. |
| 6,578,025 | B1 | 6/2003 | Pollack et al. |

(Continued)

FOREIGN PATENT DOCUMENTS

| JP | 2000-353133 | 12/2000 |
| JP | 2003-099371 | 4/2003 |

(Continued)

OTHER PUBLICATIONS

Balvanz, Jeff, et al., "Spam Software Evaluation, Training, and Support: Fighting Back to Reclaim the Email Inbox," in the Proc. of the 32nd Annual ACM SIGUCCS Conference on User Services, Baltimore, MD, pp. 385-387, 2004.

(Continued)

*Primary Examiner* — Kenneth R Coulter
(74) *Attorney, Agent, or Firm* — Polsinelli LLP

(57) ABSTRACT

A method of determining whether a guarded term is represented in a message comprises associating a portion of the message with the guarded term and evaluating a cost of the association. A method of generating a collection of guarded terms that represents an original term comprises generating a plurality of variations of the original term, evaluating similarity of each of the plurality of variations with respect to the original term and determining whether the similarity meets a predetermined criterion.

20 Claims, 5 Drawing Sheets

(56) References Cited

U.S. PATENT DOCUMENTS

| | | | |
|---|---|---|---|
| 6,650,890 B1 | 11/2003 | Irlam et al. | |
| 6,711,615 B2 | 3/2004 | Porras et al. | |
| 6,732,157 B1* | 5/2004 | Gordon et al. | 709/206 |
| 6,751,624 B2 | 6/2004 | Christal et al. | |
| 6,772,141 B1 | 8/2004 | Pratt et al. | |
| 6,772,196 B1* | 8/2004 | Kirsch et al. | 709/206 |
| 6,941,348 B2 | 9/2005 | Petry et al. | |
| 6,941,467 B2 | 9/2005 | Judge et al. | |
| 7,089,241 B1* | 8/2006 | Alspector et al. | 707/7 |
| 7,171,450 B2* | 1/2007 | Wallace et al. | 709/206 |
| 7,373,664 B2 | 5/2008 | Kissel | |
| 7,673,342 B2 | 3/2010 | Hursey et al. | |
| 8,713,110 B2 | 4/2014 | Oliver | |
| 8,886,727 B1 | 11/2014 | Oliver | |
| 2002/0007453 A1 | 1/2002 | Nemovicher | |
| 2002/0035561 A1 | 3/2002 | Archer et al. | |
| 2002/0059384 A1 | 5/2002 | Kaars | |
| 2002/0065895 A1 | 5/2002 | Zhang et al. | |
| 2002/0091690 A1 | 7/2002 | Bailey et al. | |
| 2002/0165861 A1 | 11/2002 | Gilmour | |
| 2002/0194487 A1 | 12/2002 | Grupe | |
| 2003/0018638 A1 | 1/2003 | Abe et al. | |
| 2003/0088627 A1 | 5/2003 | Rothwell et al. | |
| 2003/0126561 A1 | 7/2003 | Woehler et al. | |
| 2003/0172301 A1 | 9/2003 | Judge et al. | |
| 2003/0185149 A1 | 10/2003 | Daniell et al. | |
| 2003/0204569 A1* | 10/2003 | Andrews | H04L 51/12 709/206 |
| 2003/0233418 A1 | 12/2003 | Goldman | |
| 2004/0024639 A1 | 2/2004 | Goldman | |
| 2004/0024823 A1 | 2/2004 | Del Monte | |
| 2004/0103305 A1 | 5/2004 | Ginter et al. | |
| 2004/0133793 A1 | 7/2004 | Ginter et al. | |
| 2004/0139160 A1* | 7/2004 | Wallace et al. | 709/206 |
| 2004/0139165 A1* | 7/2004 | McMillan et al. | 709/206 |
| 2004/0158554 A1 | 8/2004 | Trottman | |
| 2004/0205463 A1 | 10/2004 | Darbie | |
| 2005/0021635 A1 | 1/2005 | Graham et al. | |
| 2005/0038750 A1 | 2/2005 | Cahill et al. | |
| 2005/0055410 A1 | 3/2005 | Landsman et al. | |
| 2005/0080860 A1 | 4/2005 | Daniell et al. | |
| 2005/0091321 A1 | 4/2005 | Daniell et al. | |
| 2005/0097174 A1* | 5/2005 | Daniell | 709/206 |
| 2005/0108340 A1* | 5/2005 | Gleeson et al. | 709/206 |
| 2005/0120019 A1 | 6/2005 | Rigoutsos et al. | |
| 2005/0125667 A1 | 6/2005 | Sullivan et al. | |
| 2005/0204005 A1* | 9/2005 | Purcell | G06Q 10/107 709/206 |
| 2008/0104712 A1 | 5/2008 | Oliver | |
| 2015/0047055 A1 | 2/2015 | Oliver | |

FOREIGN PATENT DOCUMENTS

| | | |
|---|---|---|
| JP | 2003337751 A | 11/2003 |
| JP | 2005-018745 | 1/2005 |
| WO | WO 2004/105332 | 12/2004 |
| WO | WO 2004/114614 | 12/2004 |

OTHER PUBLICATIONS

Weinstein, Lauren, "Spam Wars," Communications of the ACM, vol. 46, Issue 8, p. 136, Aug. 2003.
Cranor, Lorrie, et al., "Spam!," Communications of the ACM, vol. 41, Issue 8, pp. 74-83, Aug. 1998.
Gomes, Luiz, et al., "Characterizing a Spam Traffic," in the Proc. of the 4th ACM SIGCOMM Conference on Internet Measurement, Sicily, Italy, pp. 356-369, 2004.
Dwork, Cynthia, et al. "Pricing via Processing or Combating Junk Mail," CRYPTO '92, Springer-Verlag LNCS 740, pp. 139-147, 1992.
Von Ahn, Luis, et al., "Telling Humans and COmputers Apart (Automatically) or How Lazy Cryptographers do AI," Communications to the ACM, Feb. 2004.
Skoll, David F., "How to Make Sure a Human is Sending You Mail," Google Groups Thread (Nov. 17, 1996).
Byrne, Julian, "My Spamblock," Google Groups Thread (Jan. 19, 1997).
Guilmette, Ronald F., "To Mung or Not to Mung," Google Groups Thread (Jul. 24, 1997).
McCullagh, Declan, "In-Boxes that Fight Back," News.com, May 19, 2003.
"2003 CSI/FBI Computer Crime and Security Survey," Computer Security Institute and Federal Bureau of Investigation.
Bellegarda, Jerome R., et al., "Automatic Junk E-Mail Filtering Based on Latent Content," IEEE Workshop on Automatic Speech Recognition and Understanding (ASRU), 2003, St. Thomas U.S. Virgin Islands, Dec. 2003, pp. 465-470.
Berger, Tracy D., et al., "Reading Quickly in the Periphery—the Roles of Letters and Sentences," DRAFT, Journal of Vision (submitted Apr. 29, 2004).
Collins, M.S., et al., "Efficient Induction of Finite State Automata," D. Geiger, P. P. Shenoy, eds., Proceedings of the Thirteenth Conference on Uncertainty in Artificial Intelligence, Aug. 1-3, 1997, Brown University, Providence, Rhode Island, USA, San Francisco, CA: Morgan Kaufmann Publishers, 1997, pp. 99-107.
Dwyer, Kelly Pate., "New Legal Fears Prod Web Spies," DenverPost.com, May 17, 2004.
"Field Guide to Spam," Sophos, Last updated Feb. 3, 2004.
Fisher, Vivienne, "Security Holes: The Danger Within," ZDNet (Australia), Jun. 12, 2002.
Graham, Paul, "Better Bayesian Filtering," Jan. 2003.
Graham, Paul, "A Plan for Spam," Aug. 2002.
Graham-Cummings, John, "How to Beat an Adaptive Spam Filter," MIT Spam Conference, Cambridge, Massachusetts, Jan. 16, 2004.
Gaudin, Sharon, "Security Begins From Within," eSecurity Planet. com, Aug. 4, 2003.
Jaques, Robert, "IT Fuels Intellectual Property Theft," Personal Computer World, Feb. 20, 2004.
Pantel, Patrick, et al., "SpamCop: A Spam Classification & Organization Program," Poster in Proceedings of AAAI—1998 Workshop on Learning for Text Categorization, Jul. 1998.
Peled, Ariel, "Five Steps Your Company Can Take to Keep Information Private," Computerworld, Mar. 15, 2004.
Pescatore, John, "High-Profile Thefts Show Insiders Do the Most Damage," Gartner First Take, FT-18-9417, Nov. 26, 2002.
Rawlinson, Graham, "The Significance of Letter Position in Word Recognition," Ph.D. Thesis, Nottingham University, 1976.
Sahami, Mehran, et al., "A Bayesian Approach to Filtering Junk E-Mail," Proceedings of AAAI—1998 Workshop on Learning for Text Categorization, Jul. 1998.
Totty, Michael, "The Dangers in Outbound E-Mail," The Wall Street Journal, Apr. 26, 2004, pp. R6.
Vamosi, Robert, "Centralize Security for Success," ZDNet (UK), Nov. 6, 2001.
Yerazunis, Bill, "Sparse Binary Polynomial Hash Message Filtering and the CRM114 Discriminator," Proceedings of the 2003 Spam Conference, Cambridge, Massachusetts, Jan. 2003.
Templeton, Brad, "Viking-12 Junk E-Mail Blocker," (believed to have last been updated Jul. 15, 2003).
"Majordomo FAQ," Oct. 20, 2001.
Langberg, Mike, "Spam Foe Needs Filter of Himself," (Email Thread Dated Apr. 5, 2003).
Lloyd Allison, "Dynamic Programming Algorithm for Sequence Alignment," Oct. 1996.
M.J. Bishop and C.J. Rawlings (eds), "Nucleic Acid and Protein Sequence Analysis, a Practical Approach," IRL Press 1987.
"Aoccdrnig to a rscheearch at Cmabrigde Uinervtisy, it deosn't mttaer in waht oredr the ltteers in a wrod are,".
"There are 600,426,974,379,824,381,952 ways to spell Viagra," Apr. 7, 2004.
Eric Sven Ristad and Peter N. Yianilos, "Learning String Edit Distance" Learning String Edit Distance (1997), IEEE Transactions on Pattern Analysis and Machine Intelligence.
Simon M. Lucas, "Evolving Finite State Transducers: Some Initial Explorations," In Proceedings of 6th European Conference on Genetic Programming, pp. 130-141, 2003.

(56) References Cited

OTHER PUBLICATIONS

Manolo Gouy, "Secondary Structure Prediction of RNA," chapter 11, pp. 259-283.
J.F. Collins and A.F.W. Coulson, "Molecular Sequence Comparison and Alignment," chapter 13, pp. 323-358.
L. Allison, C. S. Wallace and C. N. Yee, "When is a String Like a String?" AI & Maths 1990.
U.S. Appl. No. 11/036,603 Final Office Action mailed Nov. 28, 2008.
U.S. Appl. No. 11/036,603 Office Action mailed May 30, 2008.
U.S. Appl. No. 11/927,466 Office Action mailed Dec. 24, 2008.
U.S. Appl. No. 10/869,507 Office Action mailed Dec. 9, 2008.
U.S. Appl. No. 10/869,507 Final Office Action mailed Jul. 15, 2008.
U.S. Appl. No. 10/869,507 Office Action mailed May 1, 2008.
U.S. Appl. No. 10/869,507 Office Action mailed Jan. 9, 2008.
U.S. Appl. No. 11/036,603, filed Jan. 14, 2005, Jonathan J. Oliver, Message Distribution Control.
U.S. Appl. No. 11/036,603 Final Office Action mailed Dec. 17, 2013.
U.S. Appl. No. 11/036,603 Office Action mailed Jun. 5, 2013.
U.S. Appl. No. 11/927,466 Final Office Action mailed Oct. 22, 2013.
U.S. Appl. No. 11/927,466 Office Action mailed Feb. 27, 2013.
U.S. Appl. No. 14/491,829 Office Action mailed Sep. 15, 2015.

* cited by examiner

APPROXIMATE MATCHING OF STRINGS FOR MESSAGE FILTERING

CROSS REFERENCE TO RELATED APPLICATIONS

This application is a continuation and claims the priority benefit of U.S. patent application Ser. No. 10/869,507 filed Jun. 15, 2004, now abandoned, and entitled "Approximate Matching of Strings for Message Filtering" which in turn claims the priority benefit of U.S. Provisional Patent Application No. 60/543,300 filed Feb. 9, 2004 and entitled "Approximate Matching of Strings for Message Filtering," the disclosure of which is incorporated herein by reference for all purposes.

FIELD OF THE INVENTION

The present invention relates generally to electronic messages. More specifically, a message processing technique is disclosed.

BACKGROUND OF THE INVENTION

Automated message filtering systems have become popular as the number of unwanted electronic messages (also known as "spam") increases. Some basic spam filtering products identify spam messages by searching for certain terms that are commonly present in spam messages, such as names of drugs and product descriptions The senders of spam messages (also referred to as 'spammers') have responded by substituting the typical spam indicator words with words that look similar to the average reader. For example, 'Viagra'® is a drug often advertised in spam messages. The spammers may substitute the letter 'a' with an '@' sign, use a backslash and a forward slash to form a character string '\/' to represent the letter 'V.' Other commonly employed methods include keeping the first and last letters of the keyword correct but scrambling the letters in between, and using special characters to delimit phrases instead of spaces. For example, 'Viagra'® may be represented as '\/1agra' and 'Buy Viagra® Here' may be spelled as '*Buy*\/Igrae*here*.' While the human reader can easily guess the meaning despite the misspelling and obfuscation, it is more difficult for the automated message filtering system to detect these random variations. It would be desirable if mutated spam messages can be detected. It would also be useful if the detection technique can be implemented without significantly increasing the requirements for computing resources such as memory and processing time.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique of determining whether a guarded term is represented in a message is disclosed. In some embodiments, a portion of the message is associated with the guarded term and a cost of the association is evaluated. Techniques such as dynamic programming and genetic programming are employed in some embodiments to detect mutated guarded terms. The cost information may be used to further assist the processing of the message, including message classification, content filtering, etc.

Figure 1:
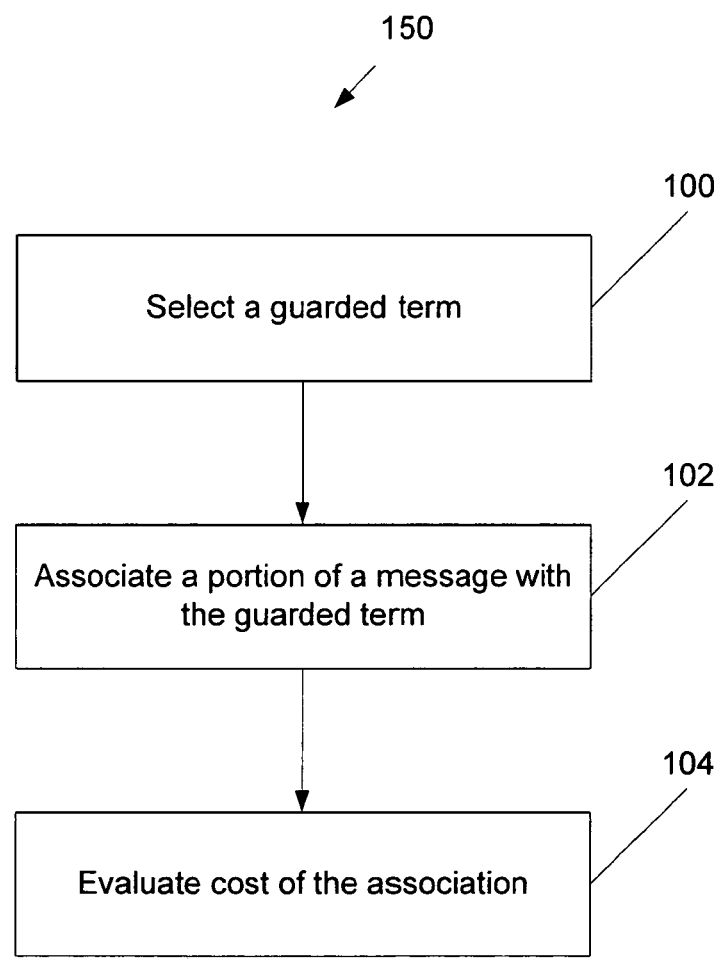
FIG. 1 is a flowchart illustrating a process for detecting the presence of a guarded term in a message.

FIG. 1 is a flowchart illustrating a process for detecting the presence of a guarded term in a message. As used herein, a guarded term refers to a word, a phrase, a sentence, a section of text, or any other appropriate string that is of special interest to the system. For example, in a spam filtering system, a guarded term may include one or more special spam terms such as key words, phrases (e.g. 'Viagra®', "Mortgage Rates"), as well as telephone fax numbers, email addresses, social security, or account numbers. In some embodiments, a guarded term may include a template. For example, a template for a telephone number may be represented as 3 digits followed by a space or parenthesis followed by 3 more digits, a dash, and 4 more digits. In a security system, a guarded term may include words and phrases that pertain to special content or confidential information. A guarded term may be represented in a mutated form in a message. Thus, although the exact spelling or arrangement of characters symbols may not appear in the message, the meaning of a guarded term can still be conveyed to the human reader. A system may include predefined guarded terms or guarded terms that are defined by users administrators of the system or both.

In this example, a guarded term is selected (100), and a portion of the message is associated with the guarded term (102). In some embodiments, associating a portion of the message with the guarded term includes mutating the message portion and comparing the mutated message portion with the guarded term. In some embodiments, the guarded term may be mutated and compared with the message portion. For example, the letter "l" may be mutated as the number "1", the letter "v" may be mutated as a back slash and a forward slash "\/", the letter "a" may be mutated as the "@" sign, etc. Sometimes spammers take advantage of the fact that mutated words are more easily recognized by the readers if the first and last letters of the word remain unchanged. Thus, in some embodiments, the association includes matching the first and the last letters of the guarded term with the first and last letters of the portion of the message.

Sometimes the guarded term may be represented graphically, such as "ASCII art" where groups of characters are specially arranged to form graphical representations of individual characters. Optical character recognition techniques may be used to associate this type of message with guarded terms. Other appropriate association techniques are also applicable and are discussed in more detail below.

The cost of the association is then evaluated (104). In some embodiments, the cost indicates how likely the guarded term is represented in the message. Process 150 may be repeated to associate other guarded terms with the message and the cost may be cumulative. It is preferable for the system to include a limited number of guarded terms so that matching can be performed efficiently.

Figure 2:
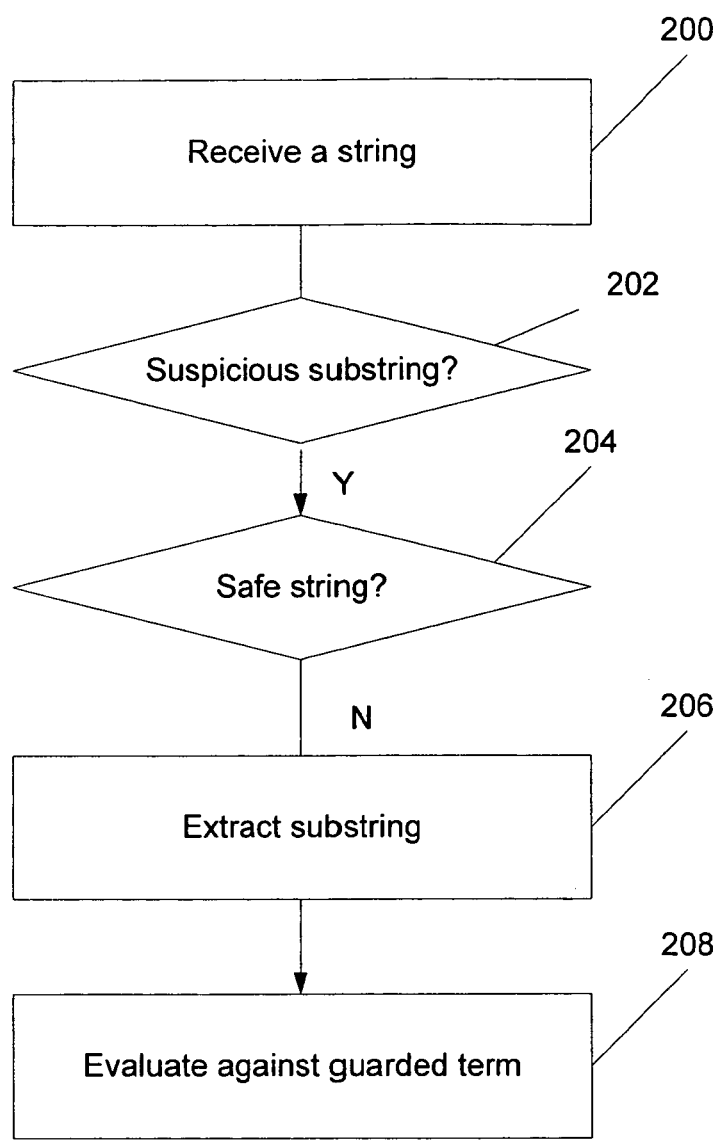
FIG. 2 is a flowchart illustrating a message processing method according to some embodiments.

FIG. 2 is a flowchart illustrating a message processing method according to some embodiments. In this example, a string is received (200). The received string may be a portion of a received message, such as plaintext extracted from the "text/plain" and "text/html" text parts of a received message. In some embodiments, a string may be a line that is delimited by special characters such as carriage return, linefeed, ASCII null, end-of-message, etc. The string may be preprocessed to eliminate special characters such as blank spaces, punctuations, etc., although the special characters may also be handled when the string is further processed.

The string is then examined to determine whether it includes any suspicious substring that may be a mutated guarded term (202). There are a number of techniques useful for finding such a suspicious substring. For example, a suspicious substring may be found by locating a substring with a first and a last letters that match the first and the last letters of a guarded term. Further details of how to locate the suspicious string are discussed below.

If a suspicious substring is found, it is determined whether the suspicious substring is a safe string (204). A safe string is a word, phrase, or expression that may be present in the message for legitimate reasons. For example, although the word 'Virginia' has the same first and last letters as 'Viagra®,' 'Virginia' is a correctly spelled word and may be present in the context of the message for legitimate reasons. In some embodiments, a string is determined to be safe if it can be found in a dictionary or database of acceptable words. If the suspicious string is not a safe string, it is extracted (206). The substring is then evaluated against the guarded term (208). Details of the evaluation are discussed below. The process may be repeated for multiple guarded terms and a cumulative score may be computed.

In some embodiments, the evaluation yields a score that indicates whether the substring and the guarded term approximately match. In some embodiments, an approximate match is found if the score reaches a certain preset threshold value. In some embodiments, multiple guarded terms are compared with the message. If the message includes substrings that approximately match one or more guarded terms, this information is provided to further assist the processing of the message. For example, the message may be further processed by a spam filter. The fact that a guarded term is represented in the message in a mutated form may indicate that the message is likely to be spam. The spam filter may assess a penalty on the message based on the knowledge, and optionally apply other filtering techniques such as white listing, thumb printing, Bayesian analysis, etc. to classify the message.

Figure 3:
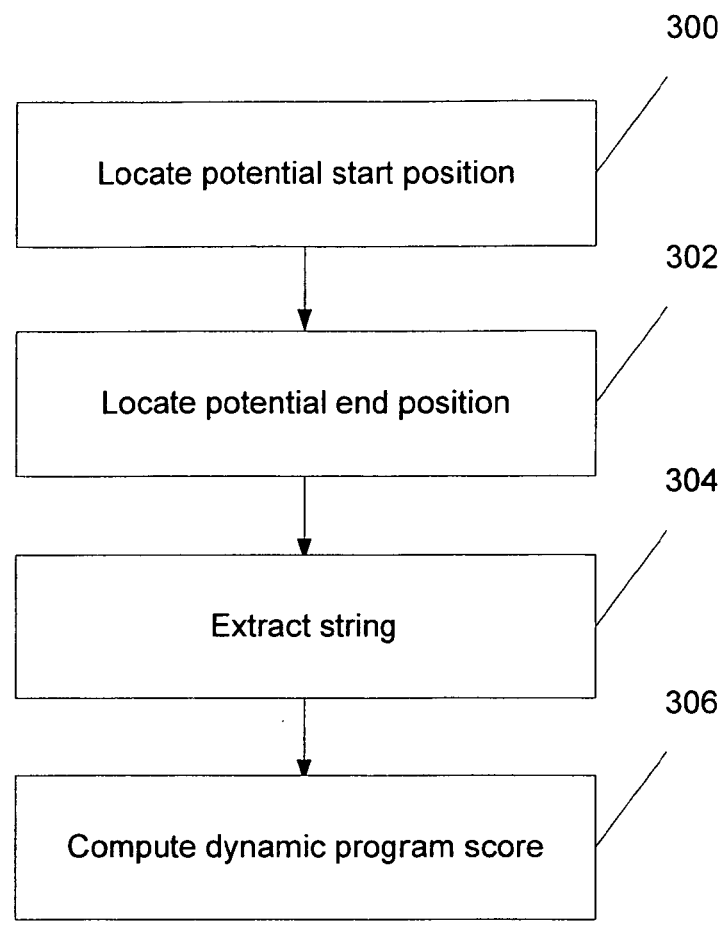
FIG. 3 is a flowchart illustrating a process for determining whether a guarded term is represented in a message string, according to some embodiments.

FIG. 3 is a flowchart illustrating a process for determining whether a guarded term is represented in a message string, according to some embodiments. A guarded term may be mutated by inserting, deleting or substituting one or more characters or symbols (also referred to as tokens) in the string, or scrambling locations of tokens. The potential start position of a guarded term (or its mutated form) is located (300). In some embodiments, the potential start position is located by finding the first character of the guarded term or by finding an equivalent token to the first character. If possible, a potential end position is located by finding the last character of the guarded term or an equivalent token (302). As used herein, an equivalent token includes one or more characters or symbols that can be used to represent a commonly used character. For example, the equivalent tokens for 'a' include 'a, ' 'A,' '@,' 'Ā,' 'ä,' 'â,' and 'å,' and the equivalent tokens for 'v' include 'v,' 'V,' '\/.' Thus, if 'Viagra ®' is the guarded term under examination, the start position for a suspicious string may be where 'v,' 'V,' or '\/' is found and the end position may be where 'a, ' 'A,' '@,' 'Ā,' 'ä,' 'â,' and 'å,' is found. The length between the potential start position and the potential end position may be optionally checked to ensure that the length is not greatly different from the length of the guarded term. Sometimes it may be useful to expand the potential start and end positions to include some extra tokens.

The string between the potential start and end position is then extracted (304). In some embodiments, if a character, a symbol or other standard token is obfuscated by using an equivalent token, the equivalent token may be identified before the string is further processed. In some embodiments, the equivalent token is replaced by the standard token before further processing. For example, "\/" (a forward and backslash) may be replaced by "v" and "|-|" (a vertical bar, a dash and another vertical bar) may be replaced by "H". A score that indicates the similarity between the suspicious string and the guarded term is computed (306). In some embodiments, the score measures the amount of mutation required for transforming the guarded term to the suspicious string (also known as the edit distance) by inserting, deleting, changing, and/or otherwise mutating characters. In some embodiments, the score measures the probability that the guarded term is represented in the suspicious string. The score may be generated using a variety of techniques, such as applying a dynamic programming algorithm (DPA), a genetic programming algorithm or any other appropriate methods to the guarded term and the suspicious string. For the purpose of illustration, computing the score using DPA is discussed in further detail, although other algorithms may also be applicable.

In some embodiments, Dynamic Programming Algorithm (DPA) is used for computing the similarity score. In one example, the DPA estimates the similarity of two strings in terms of edit distance by setting up a dynamic programming matrix. The matrix has as many rows as the number of tokens in the guarded term, and as many columns as the length of the suspicious string. Entry (I,J) in this matrix reflects the similarity score of the first I tokens in the guarded term against the first J tokens of the suspicious string. Each entry in the matrix is iteratively evaluated by taking the minimum of:

V1=Matrix(I−1, J−1)+TokenSimilarity(GuardedTerm(I), SuspiciousString(J))
V2=Matrix(I−1, J)+CostInsertion (GuardedTerm(I))
V3=Matrix(I, J−1)+CostDeletion(SuspiciousString (I))

The Similarity of the guarded term and the suspicious string is the Matrix value at entry (length(GuardedTerm), length(SuspiciousString)). In this example, the TokenSimilarity function returns a low value (close to 0) if the tokens are similar, and a high value if the characters are dissimilar. The CostInsertion function returns a high cost for inserting an unexpected token and a low cost for inserting an expected token. The CostDeletion function returns a high cost for deleting an unexpected token and a low cost for deleting an expected token.

In some embodiments, prior probabilities of tokens, which affect similarity measurements and expectations, are factored into one or all of the above functions. In some embodiments, the TokenSimilarity, CostInsertion and CostDeletion functions are adjustable. For example, in some embodiments, prior probabilities of the tokens correspond to the frequencies of characters' occurrence in natural language or in cryptographic letter frequency table. In some embodiments, the prior probabilities of the tokens in the guarded term correspond to the actual frequencies of the letters in the guarded term, and the prior probabilities of the tokens in the message correspond to the common frequencies of letters in natural language. In some embodiments, the prior probabilities of tokens in the guarded term correspond to the actual frequencies of the tokens in the guarded term, and the prior probabilities of the different tokens in the message correspond to the common frequencies of such tokens in sample messages such as sample spam messages collected from the Internet.

In some embodiments, the context of the mutation may be taken into account during the computation. For example, a mutation due to substitution of regular characters may be a typographical error, and is penalized to a lesser degree than a substitution of special characters. Thus, "Vlagre" may be penalized to a lesser degree than "Vi@gra".

Sometimes the tokens immediately preceding and immediately following the string may be special characters such as white spaces or punctuations. In some embodiments, this provides further indication that an approximate match, if found, is likely to be correct, thus the dynamic programming score is adjusted accordingly.

Figure 4A:
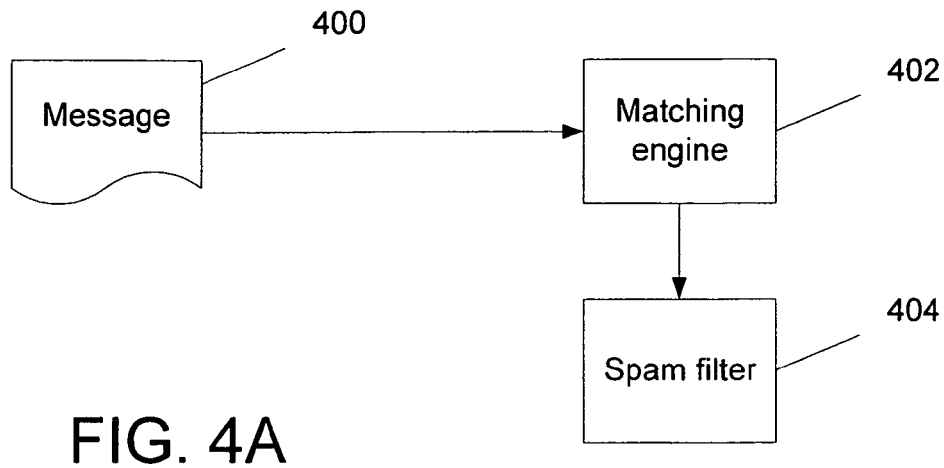
FIG. 4A is a block diagram illustrating the application of a matching engine according to some embodiments.

In some embodiments, the capabilities of associating guarded terms with message are built into a matching engine, which may be implemented as software or firmware, embedded in a processor, integrated circuit or any other appropriate devices or combinations thereof. FIG. 4A is a block diagram illustrating the application of a matching engine according to some embodiments. In this example, messages such as message 400 are sent to a matching engine 402 that compares the guarded terms with the message. The matching result is sent to spam filter 404, which determines whether the message is spam based on the matching results and optionally additional spam analysis. A matching result alone may be sufficient for classifying the message, although other filtering techniques such as white listing, thumb printing, Bayesian analysis, etc. may also be applied. A potential spam message may be deleted, quarantined, or otherwise handled as appropriate.

Figure 4B:
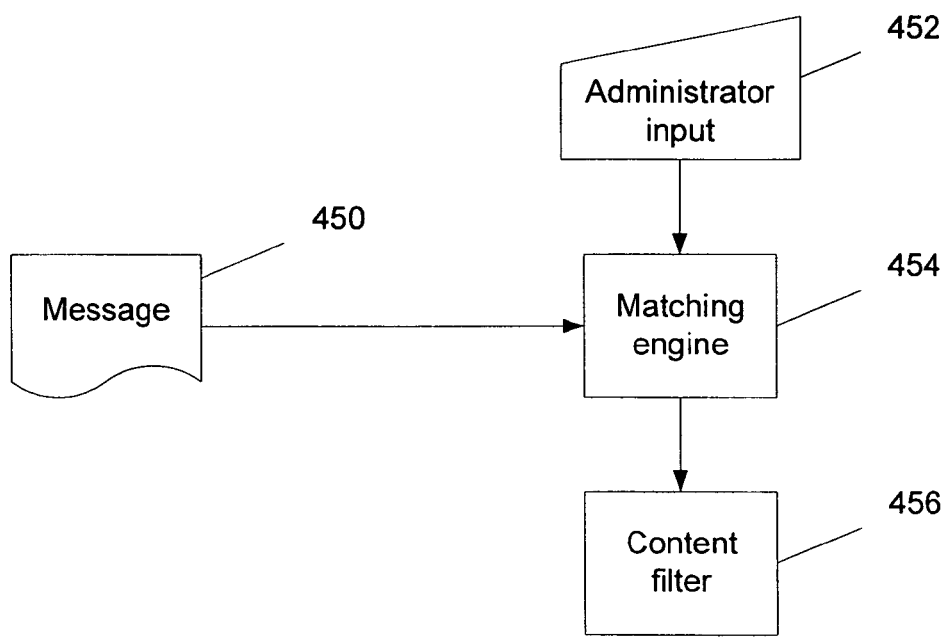
FIG. 4B is a block diagram illustrating another application of a matching engine according to some embodiments.

FIG. 4B is a block diagram illustrating another application of a matching engine according to some embodiments. In this example, a message 450 is sent to matching engine 454. The collection of guarded terms used in the matching engine may be preset or augmented by administrator input 452. The results of the matching engine are sent to content filter 456, which monitors and controls the flow of messages based on the matching results. For example, the content filter may be used in an organization to prevent confidential information from being transmitted to the external network. Although the matching engine is shown to be a component separate from the spam filter or the content filter in the above examples, the matching engine can be built into the processing filters.

Figure 5:
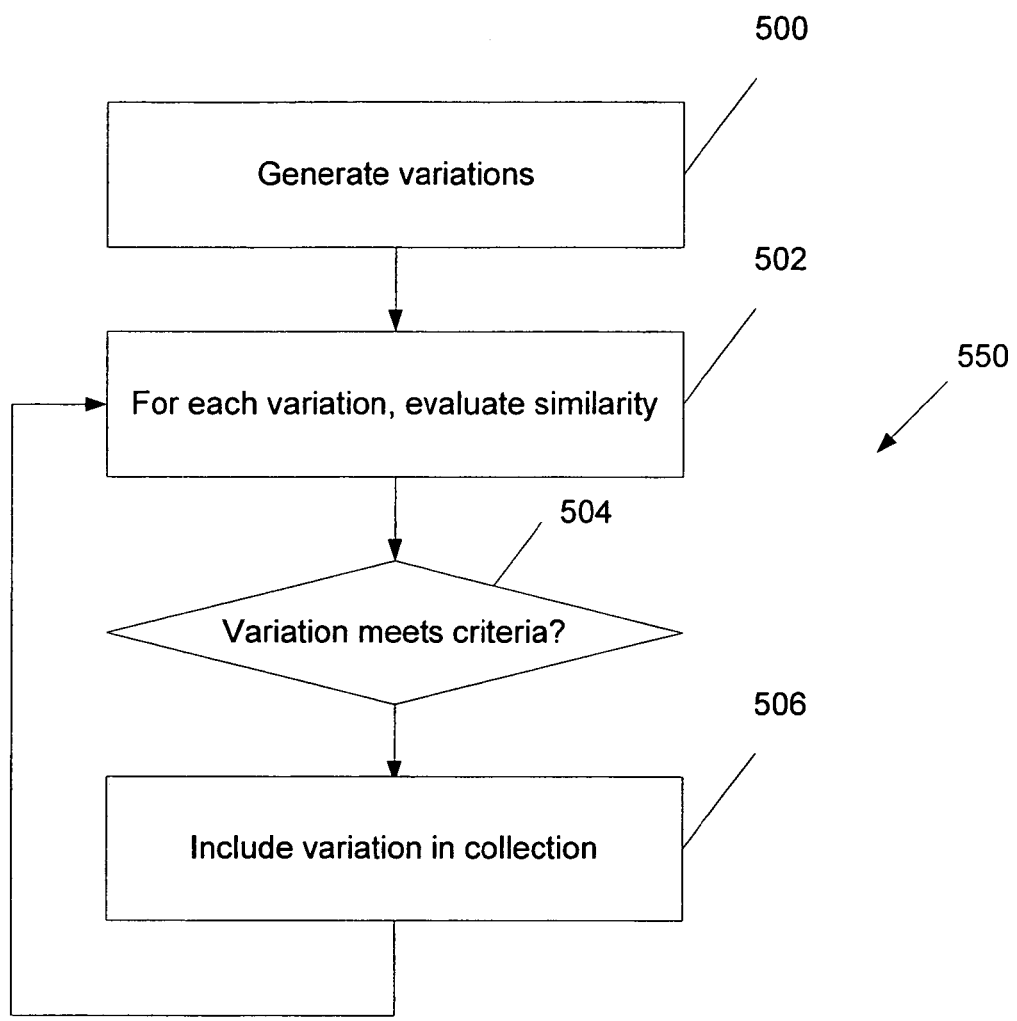
FIG. 5 is a flowchart illustrating a process for generating a collection of guarded terms according to some embodiments.

In the examples shown above, the guarded terms include special terms of interest. In some embodiments, the guarded terms also include variations of these special terms. FIG. 5 is a flowchart illustrating a process for generating a collection of guarded terms according to some embodiments. As used herein, a collection refers to a list, a table, a database, or any other appropriate grouping of items. In the example shown, variations of an original term of interest are generated (500). For example, if the original term is 'Viagra®,' then variations such as 'V1agra,' 'Vlgraa,' and other possible mutations of 'Viagra®' are generated. These variations may be generated using several techniques such as using combinatorial techniques to generate permutations of the original term or using genetic programming techniques to generate mutations of the original term. For each of the variations, the similarity between the variation and the original term is evaluated (502). The similarity may be measured as an edit distance between the variation and the original term, and evaluated using techniques such as DPA, genetic programming algorithm or any other appropriate techniques. If the variation meets a certain criteria (e.g. if the similarity measurement is above a certain threshold) (504), it is then included in the guarded term collection (506). Otherwise, the variation is discarded. In some embodiments, the process also includes an optional check to eliminate any safe words. Thus, although 'Virginia' may be sufficiently similar to 'Viagra®' in terms of edit distance, it may not be included in the guarded term collection since it is deemed to be a safe word. Process 550 may be repeated for a number of special terms of interest. The resulting collection includes variations that can be used to represent the original term. During operation, portions of the message are compared with terms in the collection to determine whether there is a match. In some embodiments, a score is then computed based on how similar the matching term is with respect to the original term.

A technique for detecting whether a guarded term is represented in a message has been disclosed. Besides spam filtering and content filtering, the technique is also applicable for HTTP traffic filtering, virus detection, and any other appropriate applications where guarded terms may be mutated and included in the data stream.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of identifying strings in an e-mail message, the method comprising:
receiving an e-mail message; and executing instructions stored in memory, wherein execution of the instructions by a processor:
identifies a text string in the e-mail message;
determines that the identified text string in the e-mail message is not a safe string, wherein safe strings are predetermined strings stored in a database of acceptable terms and identified as legitimately present in e-mail messages;
associates the text string with a guarded term from a database of guarded terms stored in memory, the guarded term being a string of special interest to a user;
evaluates a cost of the association of the identified text string that dictates a probability that the identified text string is a mutation of the associated guarded term, wherein the evaluation compares similarities and differences between the identified text string and the guarded term, and wherein the evaluation assigns different penalties for the cost based on whether the mutation includes regular characters or special characters;
matches the identified text string with the guarded term when the cost of association of the identified text string meets a predetermined threshold; and
characterizes the e-mail message based on the matching between the identified text string and the guarded term.

2. The method of claim 1, wherein execution of the instructions further:
determines a plurality of matches between a plurality of text strings in the e-mail message and guarded terms in the database of guarded terms; and
classifies the e-mail message based on the determination of a plurality of matches.

3. The method of claim 1, wherein execution of the instructions further provides the text string to the database of guarded terms.

4. The method of claim 1, wherein determining that the identified text string in the e-mail message is not a safe string includes matching the identified text string to a term in a dictionary.

5. The method of claim 1, wherein determining that the identified text string in the e-mail message is not a safe string includes matching the identified text string to a term in the database of acceptable terms.

6. The method of claim 5, wherein execution of the instructions further provides a new acceptable term designated by a user to the database of acceptable terms.

7. The method of claim 1, wherein associating the text string with the guarded term further includes identifying that the text string includes a token equivalent to content in the guarded term.

8. The method of claim 7, wherein identifying that the text string includes an equivalent token further includes identifying that a location of the token in the text string corresponds to a location of equivalent content in the guarded term.

9. The method of claim 7, wherein execution of the instructions further replaces the token in the text string with a standard token.

10. The method of claim 1, wherein evaluating a cost of the association further includes determining a number of mutations required to change the text string into the guarded term.

11. The method of claim 1, wherein evaluating a cost of the association further includes weighting the number of mutations based on a probability of mutation.

12. The method of claim 11, wherein execution of the instructions further determines the probability of the mutations based on a letter frequency table.

13. A system for identifying strings in an e-mail message, the system comprising:
a processor; and
memory storing a database of guarded terms and executable instructions, wherein the guarded terms are strings of special interest to a user, and wherein execution of the instructions by the processor:
identifies a text string in the e-mail message,
determines that the identified text string in the e-mail message is not a safe string, wherein safe strings are predetermined strings stored in a database of acceptable terms and identified as legitimately present in e-mail messages,
associates the text string with a guarded term from the database of guarded terms,
evaluates a cost of the association of the identified text string that dictates a probability that the identified text string is a mutation of the associated guarded term, wherein the evaluation compares similarities and differences between the identified text string and the guarded term, and wherein the evaluation assigns different penalties for the cost based on whether the mutation includes regular characters or special characters,
matches the identified text string with the guarded term when the cost of association of the identified text string meets a predetermined threshold, and
characterizes the e-mail message based on the matching between the identified text string and the guarded term.

14. The system of claim 13, wherein execution of the instructions further:
determines a plurality of matches between a plurality of text strings in the e-mail message and guarded terms in the database of guarded terms; and
classifies the e-mail message based on the determination of a plurality of matches.

15. The system of claim 13, wherein execution of the instructions further identifies that the text string includes a token equivalent to content in the guarded term.

16. The system of claim 15, wherein execution of the instructions further identifies that a location of the token in the text string corresponds to a location of equivalent content in the guarded term.

17. The system of claim 13, wherein the execution of the instructions further determines a number of mutations required to change the text string into the guarded term.

18. The system of claim 17, wherein execution of the instructions further weighs the number of mutations based on a probability of mutation.

19. A non-transitory computer-readable storage medium, having embodied thereon a program, the program being executable by a processor to perform a method for identifying strings in an e-mail message, the method comprising:
identifying a text string in the e-mail message;
determining that the identified text string in the e-mail message is not a safe string, wherein safe strings are predetermined strings stored in a database of acceptable terms and identified as legitimately present in e-mail messages;
associating the text string with a guarded term from a database of guarded terms stored in memory, the guarded term being a string of special interest to a user;

evaluating a cost of the association of the identified text string that dictates a probability that the identified text string is a mutation of the associated guarded term, wherein the evaluation compares similarities and differences between the identified text string and the guarded term, and wherein the evaluation assigns different penalties for the cost based on whether the mutation includes regular characters or special characters;

matching the identified text string with the guarded term when the cost of association of the identified text string meets a predetermined threshold; and characterizing the e-mail message based on the matching between the identified text string and the guarded term.

20. The non-transitory computer-readable storage medium of claim 19, wherein the method further comprises:

determining a plurality of matches between a plurality of text strings in the e-mail message and guarded terms in the database of guarded terms; and classifying the e-mail message based on the determination of a plurality of matches.

\* \* \* \* \*